(12) United States Patent
Belack et al.

(10) Patent No.: US 8,722,279 B2
(45) Date of Patent: May 13, 2014

(54) POLYAZOLE-CONTAINING COMPOSITION

(75) Inventors: Jörg Belack, Mainz (DE); Klaus Leitner, Ludwigshafen (DE); Thomas Justus Schmidt, Mörfelden-Walldorf (DE); Gunter Christ, Wallrabenstein (DE); Bernd-Steffen von Bernstorff, Wachenheim (DE)

(73) Assignee: BASF SE (DE)

( * ) Notice: Subject to any disclaimer, the term of this patent is extended or adjusted under 35 U.S.C. 154(b) by 102 days.

(21) Appl. No.: 13/377,295

(22) PCT Filed: Jun. 17, 2010

(86) PCT No.: PCT/EP2010/003670
§ 371 (c)(1),
(2), (4) Date: Dec. 9, 2011

(87) PCT Pub. No.: WO2010/145827
PCT Pub. Date: Dec. 23, 2010

(65) Prior Publication Data
US 2012/0094211 A1 Apr. 19, 2012

(30) Foreign Application Priority Data
Jun. 20, 2009 (EP) .................................... 09008110

(51) Int. Cl.
| | |
|---|---|
| *H01M 8/10* | (2006.01) |
| *D01D 5/08* | (2006.01) |
| *D01D 5/088* | (2006.01) |
| *B05D 5/12* | (2006.01) |
| *B32B 38/10* | (2006.01) |

(52) U.S. Cl.
USPC ......... 429/492; 427/115; 156/247; 264/178 F

(58) Field of Classification Search
None
See application file for complete search history.

(56) References Cited

U.S. PATENT DOCUMENTS

| | | | | |
|---|---|---|---|---|
| 2005/0095482 A1* | 5/2005 | Garner et al. | ................... | 429/30 |
| 2005/0147859 A1 | 7/2005 | Kiefer et al. | | |
| 2006/0008690 A1 | 1/2006 | Uensal et al. | | |
| 2008/0050514 A1 | 2/2008 | Calundann et al. | | |
| 2008/0057358 A1* | 3/2008 | Calundann et al. | ............. | 429/12 |
| 2010/0181697 A1* | 7/2010 | Uensal et al. | ............ | 264/211.24 |
| 2010/0216051 A1 | 8/2010 | Uensal et al. | | |
| 2011/0288187 A1 | 11/2011 | Calundann et al. | | |

FOREIGN PATENT DOCUMENTS

| | | |
|---|---|---|
| DE | 102 13 540 A1 | 2/2004 |
| DE | 102 46 459 A1 | 4/2004 |
| DE | 102 46 461 A1 | 4/2004 |
| WO | WO-9613872 A1 | 5/1996 |
| WO | WO-9904445 A1 | 1/1999 |
| WO | WO-02088219 A1 | 11/2002 |
| WO | WO-03022412 A2 | 3/2003 |
| WO | WO-2008031554 A1 | 3/2008 |

OTHER PUBLICATIONS

International Preliminary Report on Patentability from PCT/EP2010/003670.
International Search Report for PCT/EP2010/003670 mailed Jan. 5, 2011.

* cited by examiner

*Primary Examiner* — Patrick Ryan
*Assistant Examiner* — Christopher Domone
(74) *Attorney, Agent, or Firm* — Novak Druce Connolly Bove + Quigg LLP

(57) ABSTRACT

Composition in the form of a solution and/or dispersion, comprising:
  at least one polyazole with an intrinsic viscosity, measured in at least 96% by weight sulfuric acid, in the range from 3.0 to 8.0 g/dl, and
  orthophosphoric acid ($H_3PO_4$) and/or polyphosphoric acid,
wherein
  the polyazole content, based on the total weight of the composition, is in the range from 0.5% by weight to 30.0% by weight,
  the $H_3PO_4$ and/or polyphosphoric acid content, based on the total weight of the composition, is in the range from 30.0% by weight to 99.5% by weight,
  the $H_3PO_4$ and/or polyphosphoric acid concentration, calculated as $P_2O_5$ (by acidimetric means), based on the total amount of $H_3PO_4$ and/or polyphosphoric acid and/or water, is in the range from 70.5% to 75.45%.
Additionally protected are particularly advantageous processes for preparation and for use of the inventive composition.

19 Claims, No Drawings

POLYAZOLE-CONTAINING COMPOSITION

CROSS-REFERENCE TO RELATED APPLICATIONS

This application is a national stage application (under 35 U.S.C. §371) of PCT/EP2010/003670, filed Jun. 17, 2010, which claims benefit of European application 09008110.0, filed Jun. 20, 2009.

BACKGROUND OF THE INVENTION

The present invention relates to a polyazole-containing composition in the form of a solution and/or dispersion, to a process for preparation thereof and to the use thereof, especially for production of membrane electrode assemblies for fuel cells.

Polymer electrolyte membranes (PEMs) are already known and are especially used in fuel cells. Frequently, sulfonic acid-modified polymers, especially perfluorinated polymers, are employed. A prominent example thereof is Nafion™ from DuPont de Nemours, Willmington USA. For proton conduction, a relatively high water content in the membrane is required, which is typically 4-20 molecules of water per sulfonic acid group. The necessary water content, but also the stability of the polymer in conjunction with acidic water and the hydrogen and oxygen reaction gases, limits the operating temperature of the PEM fuel cell stack typically to 80-100° C. Under pressure, the operating temperature can be increased to >120° C. Otherwise, higher operating temperatures cannot be achieved without a loss in performance of the fuel cell.

For system reasons, however, higher operating temperatures than 100° C. in the fuel cell are desirable. The activity of the noble metal-based catalysts present in the membrane electrode unit (MEU) is significantly better at high operating temperatures. More particularly, in the case of use of what are called reformates from hydrocarbons, distinct amounts of carbon monoxide are present in the reformer gas, which typically have to be removed by complex gas treatment or gas purification. At high operating temperatures, the tolerance of the catalysts to the CO impurities rises up to several % by volume of CO.

In addition, heat evolves in the operation of fuel cells. Cooling of these systems to below 80° C. can, however, be very costly and inconvenient. According to the power output, the cooling apparatuses can be made much simpler. This means that, in fuel cell systems which are operated at temperatures above 100° C., the waste heat can be utilized much better, and hence the fuel cell system efficiency can be enhanced by power-heat coupling.

In order to attain these temperatures, membranes with novel conductivity mechanisms are generally used. One approach for this purpose is the use of membranes which exhibit electrical conductivity without the use of water. A first development in this direction is detailed, for example, in WO 96/13872. For instance, WO 96/13872 discloses the use of acid-doped polybenzimidazole membranes which are produced by a casting process.

A new generation of acid-containing polyazole membranes which likewise exhibit electrical conductivity without the use of water is described in WO 02/088219. This application discloses a proton-conducting polymer membrane based on polyazoles, which is obtainable by a process comprising the following steps:
A) mixing one or more aromatic tetramino compounds with one or more aromatic carboxylic acids or esters thereof which comprise at least two acid groups per carboxylic acid monomer, or mixing one or more aromatic and/or heteroaromatic diaminocarboxylic acids, in polyphosphoric acid to form a solution and/or dispersion
B) applying a layer using the mixture according to step A) on a carrier, optionally on an electrode,
C) heating the flat structure/sheet obtainable according to step B) under inert gas to temperatures of up to 350° C., preferably up to 280° C., to form the polyazole polymer,
D) treating the membrane formed in step C) until it is self-supporting, preferably by partial hydrolysis.

The polyphosphoric acid used in step A) typically has a content, calculated as $P_2O_5$ (by acidimetric means), of at least 83%.

To adjust the viscosity, the solution can optionally be admixed with phosphoric acid (conc. phosphoric acid, 85%).

The examples describe numerous syntheses in a polyphosphoric acid having a content, calculated as $P_2O_5$ (by acidimetric means), of 83.4%. Some of the batches are diluted with conc. phosphoric acid.

The content of the resulting solutions, calculated as $P_2O_5$ (by acidimetric means), is either at most 70.487752% (=theoretical $H_3PO_4$ concentration: 97.3%; example 5) or at least 75.465388% (=theoretical $H_3PO_4$ concentration: 104.2%, example 3).

The intrinsic viscosity of the polymers at 30° C. is 2.9 dl/g or less.

The acid-containing polyazole membranes disclosed in WO 02/088219 exhibit a favorable profile of properties per se and are especially suitable for use in membrane electrode assemblies for fuel cells.

However, the solutions and/or dispersions obtainable in step A) have a high viscosity, especially for relatively high solids contents. The same applies to the polymer solutions or dispersion obtainable by polymerizing the monomers, the viscosity of the solution or dispersions rising further with rising degree of polymerization.

The processing of the solutions or dispersions therefore frequently requires relatively high temperatures. However, the problem is confronted here that the viscosity of the solutions and/or dispersions continues to rise constantly with time above 170° C.

In addition, the hydrolysis in step D) proceeds relatively slowly. Furthermore, the production of thin and/or defect-free membranes or self-supporting films/flat structures is possible only with difficulty.

Finally, membranes with better mechanical properties, especially a higher tensile strength and an improved mechanical stability, are desirable.

BRIEF SUMMARY OF THE INVENTION

It was therefore an object of the present invention to indicate means for improvement of the production process for such polyazole membranes and ways of more easily and efficiently further processing such polyazole membranes, especially in the production of membrane electrode assemblies, preferably for fuel cells. Particular aims were processability at relatively low temperatures, faster hydrolysis and the possibility of production of very thin and very substantially defect-free membranes. Moreover, the polymers and membranes were if at all possible to have improved properties, such as superior mechanical properties, more particularly a higher tensile strength and/or an improved mechanical stability. At the same time, the desired advantages and effects were to be achievable in a very simple manner, on the industrial scale and inexpensively.

These objects are achieved by the provision of a composition having all the features of claim 1. Particularly appropriate embodiments of the inventive composition are described in the dependent claims. Additionally protected are particularly advantageous processes for preparation and for use of the inventive composition.

The present invention accordingly provides a composition in the form of a solution and/or dispersion, comprising:
at least one polyazole with an intrinsic viscosity, measured in at least 96% by weight sulfuric acid, in the range from 3.0 to 8.0 g/dl, and
orthophosphoric acid ($H_3PO_4$) and/or polyphosphoric acid,
wherein
the polyazole content, based on the total weight of the composition, is in the range from 0.5% by weight to 30.0% by weight,
the $H_3PO_4$ and/or polyphosphoric acid content, based on the total weight of the composition, is in the range from 30.0% by weight to 99.5% by weight,
the $H_3PO_4$ and/or polyphosphoric acid concentration, calculated as $P_2O_5$ (by acidimetric means), based on the total amount of $H_3PO_4$ and/or polyphosphoric acid and/or water, is in the range from 70.5% to 75.45%.

The inventive composition is notable, as compared with the known compositions, for a lower viscosity at the same solids content. It allows better processing, especially at lower temperatures, faster hydrolysis, and especially the production of thin, defect-free membranes and self-supporting films. It is possible to add additives, for example crosslinkers, fillers or the like, without significantly influencing the flow properties of the composition. In addition, the resulting membranes have distinctly improved properties, such as superior mechanical properties, especially a higher tensile strength and/or an improved mechanical stability. The inventive advantages and effects can be achieved in a comparatively simple manner, on the industrial scale and inexpensively.

A DETAILED DESCRIPTION OF THE INVENTION

The inventive composition preferably comprises at least one polyazole. Polyazoles in the context of the present invention are understood to mean those polymers in which the repeat unit in the polymer preferably comprises at least one aromatic ring with at least one nitrogen atom. The aromatic ring is preferably a five- or six-membered ring which has one to three nitrogen atoms and may be fused to one other ring, more particularly another aromatic ring. Individual nitrogen heteroatoms may also be replaced by oxygen, phosphorus and/or sulfur atoms. The heterocyclic aromatic rings are preferably in the main polymer chain, but may also be in the side chain. Particular preference is given to those basic polymers which comprise, in the repeat unit, unsaturated five-membered or six-membered aromatic units containing, in the ring, 1-5 nitrogen atoms or, as well as nitrogen atoms, one or more other heteroatoms.

The polyazole used, preferably a polybenzimidazole, has a high molecular weight. Measured as the intrinsic viscosity, this is at least 3.0 dl/g, preferably at least 3.5 dl/g, more preferably at least 4.0 dl/g, especially at least 4.5 dl/g. The upper limit is 8.0 dl/g, preferably 7.0 dl/g, more preferably 6.0 dl/g, especially 5.5 dl/g. The molecular weight is thus well above that of the commercial polybenzimidazole (IV<1.1 dl/g).

The intrinsic viscosity is determined as described hereinafter: For this purpose, the polymer is first dried at 160° C. over 2 h. 100 mg of the polymer thus dried are then dissolved in 100 ml of concentrated sulfuric acid (min. 96% by weight) at 80° C. over 4 h. The inherent or intrinsic viscosity is determined from this solution to ISO 3105 (DIN 51562, ASTM D2515) with an Ubbelohde viscometer at a temperature of 25° C.

The solution viscosity of the inventive composition, measured with a rotary viscometer at a temperature of 150° C. and a shear rate of 1 Hz, is preferably in the range from 0.1 Pas to 300 Pas, more preferably in the range from 0.5 Pas to 100 Pas, especially preferably in the range from 1 Pas to 50 Pas, especially in the range from 5 Pas to 25 Pas. The solution viscosity of the inventive composition, measured with a rotary viscometer at a temperature of 150° C. and a shear rate of 100 Hz, is preferably in the range from 0.1 Pas to 100 Pas, more preferably in the range from 0.5 Pas to 50 Pas, especially preferably in the range from 1 Pas to 25 Pas, especially in the range from 3 Pas to 10 Pas. The solution viscosity is preferably measured on the basis of DIN 53018 between two 25 mm plates with a constant gap of 1 mm.

Further information regarding the viscosity parameters and the corresponding determination methods can be found in the standard specialist literature, for example Ullmann 1, 67-85; (4.) 5, 755-778, the disclosure of which is hereby incorporated by reference.

The polyazole preferably comprises repeat azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

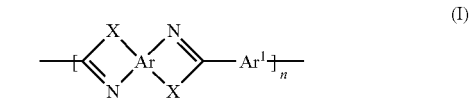

(I)

(II)

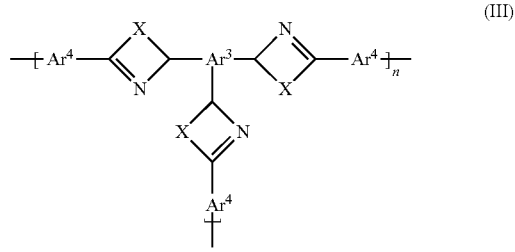

(III)

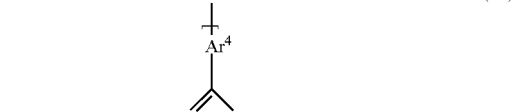

(IV)

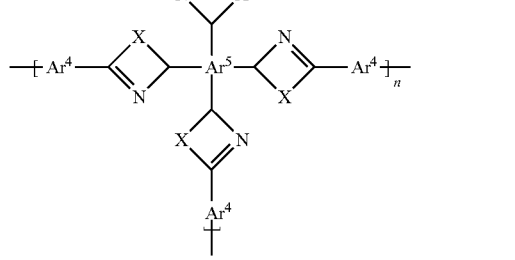

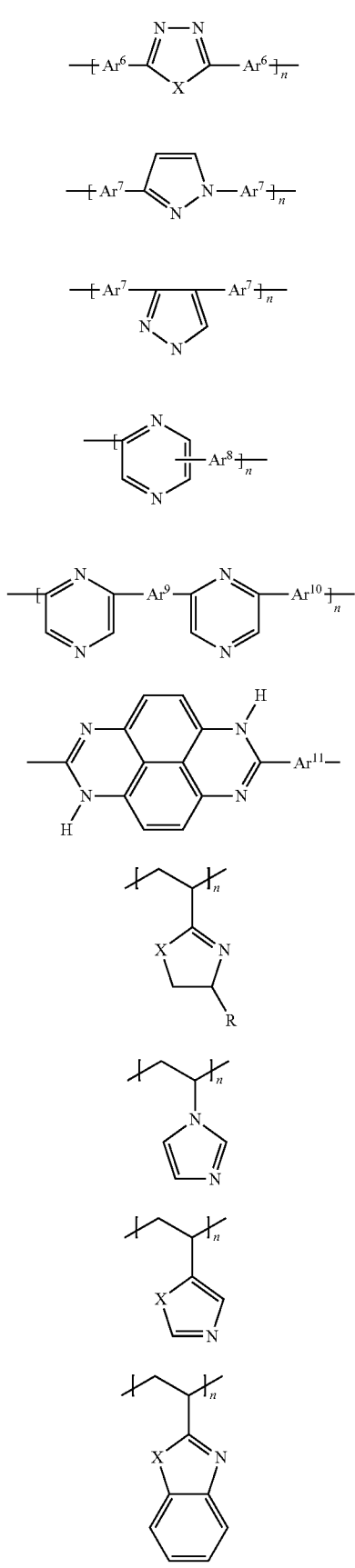
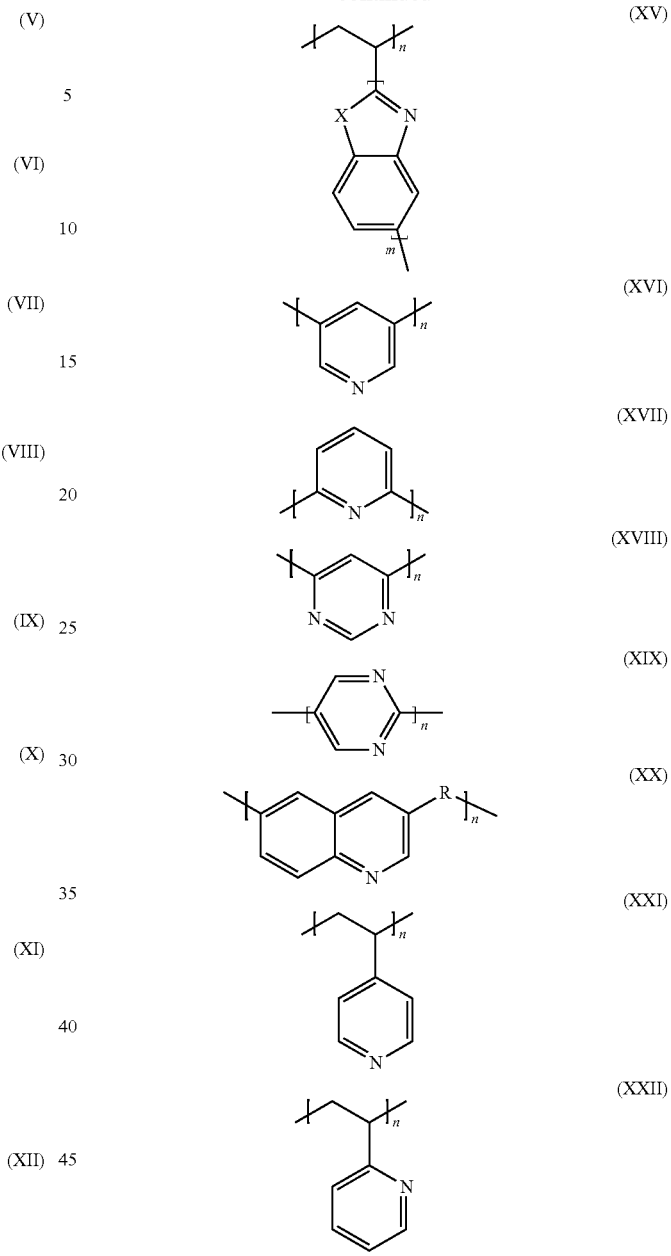

in which
Ar are the same or different and are each a tetravalent aromatic or heteroaromatic group which may be mono- or polycyclic,
$Ar^1$ are the same or different and are each a divalent aromatic or heteroaromatic group which may be mono- or polycyclic,
$Ar^2$ are the same or different and are each a di- or trivalent aromatic or heteroaromatic group which may be mono- or polycyclic,
$Ar^3$ are the same or different and are each a trivalent aromatic or heteroaromatic group which may be mono- or polycyclic,
$Ar^4$ are the same or different and are each a trivalent aromatic or heteroaromatic group which may be mono- or polycyclic, Ar⁵ are the same or different and are each a tetravalent aromatic or heteroaromatic group which may be mono- or polycyclic, Ar⁶ are the same or different and are each a divalent aromatic or heteroaromatic group which may be mono- or polycyclic, Ar⁷ are the same or different and are each a divalent aromatic or heteroaromatic group which may be mono- or polycyclic, Ar⁸ are the same or different and are each a trivalent aromatic or heteroaromatic group which may be mono- or polycyclic, Ar⁹ are the same or different and are each a di- or tri- or tetravalent aromatic or heteroaromatic group which may be mono- or polycyclic, Ar¹⁰ are the same or different and are each a di- or trivalent aromatic or heteroaromatic group which may be mono- or polycyclic, Ar¹¹ are the same or different and are each a divalent aromatic or heteroaromatic group which may be mono- or polycyclic, X is the same or different and is oxygen, sulfur or an amino group which bears a hydrogen atom, a group having 1-20 carbon atoms, preferably a branched or unbranched alkyl or alkoxy group, or an aryl group as a further radical, R in all formulae except formula (XX) is the same or different and is hydrogen, an alkyl group or an aromatic group, and in formula (XX) is an alkylene group or an aromatic group, and n, m are each integers greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

The substitution pattern of Ar¹, Ar⁴, Ar⁶, Ar⁷, Ar⁶, Ar⁹, Ar¹⁰, Ar¹¹ is as desired; in the case of phenylene, for example, Ar¹, Ar⁴, Ar⁶, Ar⁷, Ar⁸, Ar⁹, Ar¹⁰, Ar¹¹ may be ortho-, meta- and para-phenylene. Particularly preferred groups derive from benzene and biphenylene, which may optionally also be substituted.

Preferred alkyl groups are short-chain alkyl groups having 1 to 4 carbon atoms, for example methyl, ethyl, n- or i-propyl and t-butyl groups.

Preferred aromatic groups are phenyl or naphthyl groups. The alkyl groups and the aromatic groups may be substituted.

Preferred substituents are halogen atoms, for example fluorine, amino groups, hydroxy groups or short-chain alkyl groups, for example methyl or ethyl groups.

Preference is given to polyazoles having repeat units of the formula (I) in which the X radicals are the same within one repeat unit.

The polyazoles may in principle also have different repeat units which differ, for example, in their X radical. However, it preferably has only identical X radicals in one repeat unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetraazapyrenes).

In a further embodiment of the present invention, the polyazole is a copolymer which comprises at least two units of the formulae (I) to (XXII) which differ from one another. The polymers may be in the form of block copolymers (diblock, triblock), random copolymers, periodic copolymers and/or alternating polymers.

In a particularly preferred embodiment of the present invention, the polyazole is a homopolymer which comprises only units of the formula (I) and/or (II).

The number of repeat azole units in the polymer is preferably an integer greater than or equal to 10. Particularly preferred polymers comprise at least 100 repeat azole units.

In the context of the present invention, preference is given to polymers comprising repeat benzimidazole units. Some examples of the highly appropriate polymers comprising repeat benzimidazole units are represented by the following formulae:

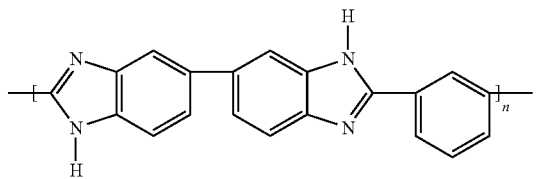
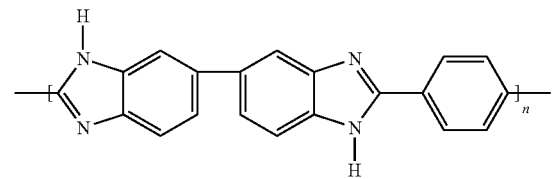
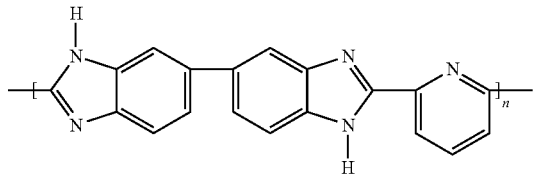
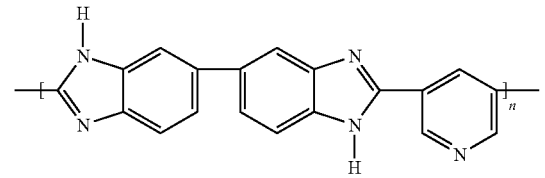
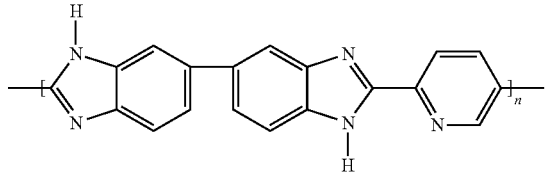
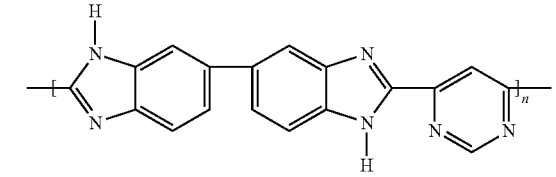

-continued
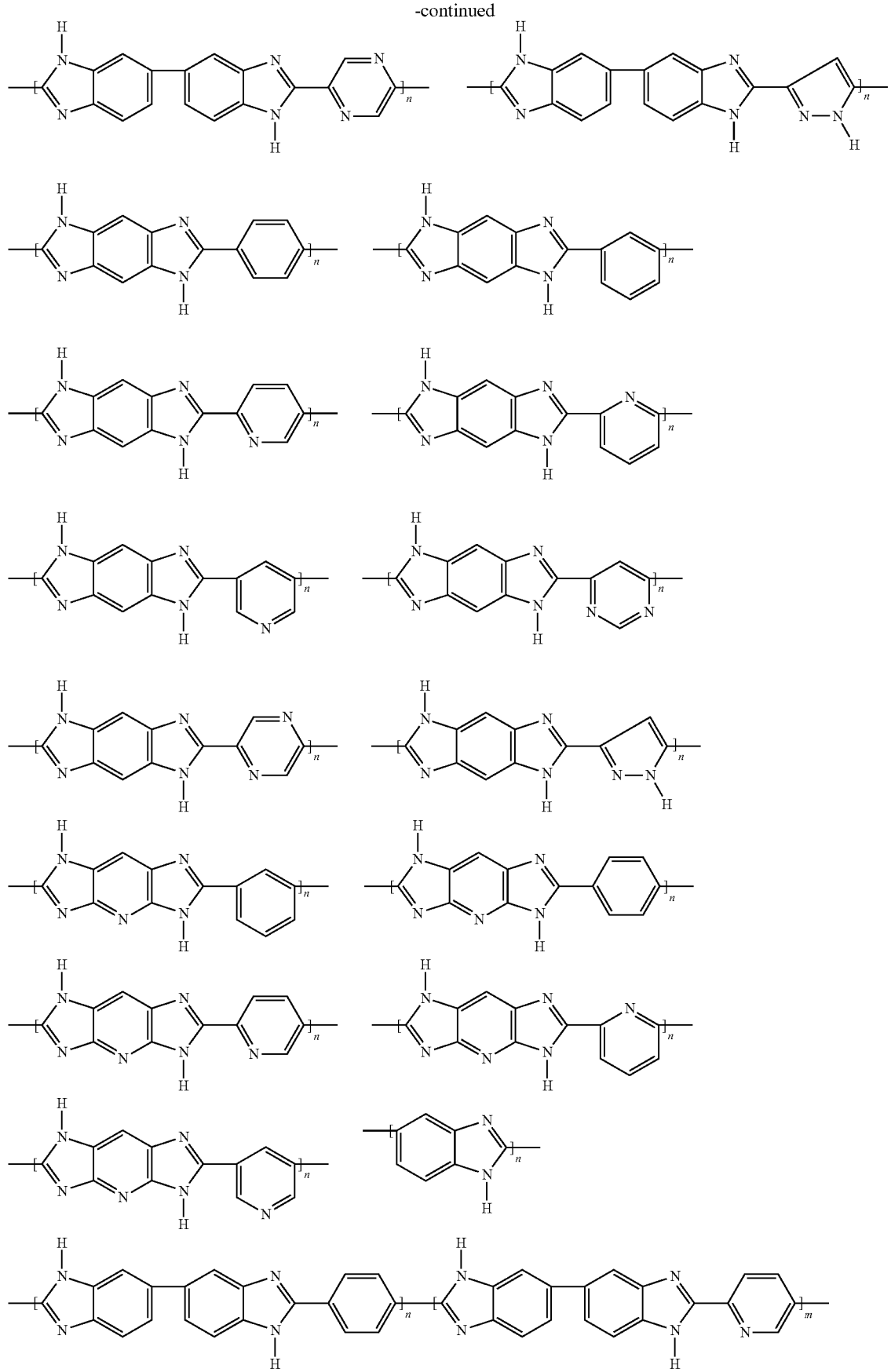

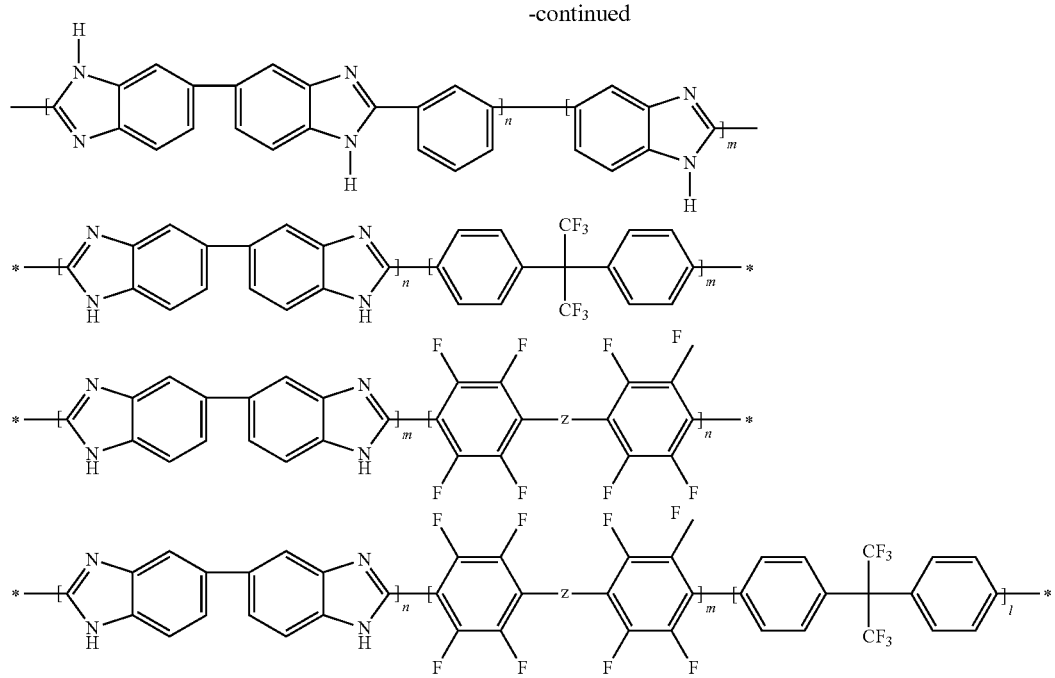

In the last formula, the azole units and the two fluorinated components may be joined to one another in any sequence. The preparation can be effected in the form of a polymer, random copolymer or block copolymer.

In addition, n and m in the above formulae are each independently an integer greater than or equal to 10, preferably greater than or equal to 100.

In a particularly preferred variant of the present invention, the polyazoles have at least one sulfonic acid and/or phosphonic acid group. Such polymers are described in publication DE 102 46 459 A1, the disclosure of which is hereby incorporated by reference.

Preferred polybenzimidazoles are commercially available under the ®Celazole or else ®Hozole (from Hostec, Austria) trade name.

The polyazoles can be prepared in a manner known per se, but preference is given to the reaction of one or more aromatic and/or heteroaromatic tetramino compounds with one or more aromatic and/or heteroaromatic carboxylic acids or derivatives thereof which comprise at least two acid groups per carboxylic acid monomer. In addition, it is also possible to use one or more aromatic and/or heteroaromatic diaminocarboxylic acids for preparation of polyazoles.

The usable aromatic and heteroaromatic tetramino compounds include 3,3',4,4'-tetraminobiphenyl, 2,3,5,6-tetraminopyridine, 1,2,4,5-tetraminobenzene, 3,3',4,4'-tetraminodiphenyl sulfone, 3,3',4,4'-tetraminodiphenyl ether, 3,3',4,4'-tetraminobenzophenone, 3,3',4,4'-tetraminodiphenylmethane and 3,3',4,4'-tetraminodiphenyldimethylmethane and salts thereof, especially the mono-, di-, tri- and tetrahydrochloride derivatives thereof. Among these, particular preference is given to 3,3',4,4'-tetraminobiphenyl, 2,3,5,6-tetraminopyridine and 1,2,4,5-tetraminobenzene.

The aromatic and/or heteroaromatic carboxylic acids are preferably dicarboxylic acids and tricarboxylic acids and tetracarboxylic acids, or the esters thereof or the anhydrides thereof or the acid halides thereof, especially the acid halides and/or acid bromides thereof. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, 2,2-bis(4-carboxyphenyl)hexafluoropropane, 4,4'-stilbenedicarboxylic acid and 4-carboxycinnamic acid, or the C1-C20-alkyl esters or C5-C12-aryl esters thereof or the acid anhydrides thereof or the acid chlorides thereof.

The aromatic tricarboxylic acids or the C1-C20-alkyl esters or C5-C12-aryl esters thereof or the acid anhydrides thereof or the acid chlorides thereof are preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid.

The aromatic tetracarboxylic acids or the C1-C20-alkyl esters or C5-C12-aryl esters thereof or the acid anhydrides thereof or the acid chlorides thereof are preferably 3,5,3',5'-biphenyltetracarboxylic acid, benzene-1,2,4,5-tetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are preferably heteroaromatic dicarboxylic acids and tricarboxylic acids and tetracarboxylic acids, or the esters thereof or the anhydrides thereof. Heteroaromatic carboxylic acids are understood to mean aromatic systems which contain at least one nitrogen, oxygen, sulfur or phosphorus atom in the aromatic ring. They are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also the C1-C20-alkyl esters or C5-C12-aryl esters thereof, or the acid anhydrides thereof or the acid chlorides thereof.

The content of tricarboxylic acid or tetracarboxylic acids (based on the dicarboxylic acid used) is preferably between 0 and 30 mol %, preferably 0.1 and 20 mol %, especially 0.5 and 10 mol %.

In addition, it is also possible to use aromatic and heteroaromatic diaminocarboxylic acids. These include diaminobenzoic acid, 4-phenoxycarbonyl-3',4'-diaminodiphenyl ether and the mono- and dihydrochloride derivatives thereof.

Preferably, mixtures of at least 2 different aromatic carboxylic acids are used. Particular preference is given to using mixtures which comprise, as well as aromatic carboxylic acids, also heteroaromatic carboxylic acids. The mixing ratio of aromatic carboxylic acids to heteroaromatic carboxylic acids is between 1:99 and 99:1, preferably between 1:50 and 50:1.

These mixtures are especially mixtures of N-heteroaromatic dicarboxylic acids and aromatic dicarboxylic acids. Nonlimiting examples of dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenyl sulfone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

If a maximum molecular weight is to be achieved, the molar ratio of carboxylic acid groups to amino groups in the reaction of tetramino compounds with one or more aromatic carboxylic acids or esters thereof which comprise at least two acid groups per carboxylic acid monomer is preferably close to 1:2.

Preferably at least 0.5% by weight, especially 1 to 30% by weight and more preferably 2 to 15% by weight of monomers are used for the preparation of polyazoles, based in each case on the resulting weight of the composition to be used.

When tricarboxylic acids or tetracarboxylic acids are also used, this achieves branching/crosslinking of the polymer formed. This contributes to improvement in the mechanical properties.

For polymerization, the monomer(s) is/are preferably heated to a temperature of up to 400° C., especially 350° C., preferably up to 280° C., especially in the range from 100° C. to 250° C., most preferably in the range from 160° C. to 250° C., especially in the range from 200° C. to 240° C.

In a further aspect of the present invention, compounds suitable for formation of polyazoles under the action of heat are used, these compounds being obtainable by reaction of one or more aromatic and/or heteroaromatic tetramino compounds with one or more aromatic and/or heteroaromatic carboxylic acids or derivatives thereof which comprise at least two acid groups per carboxylic acid monomer, or of one or more aromatic and/or heteroaromatic diaminocarboxylic acids in the melt at temperatures of up to 400° C., especially up to 350° C., preferably up to 280° C. The compounds to be used for preparation of these prepolymers have been detailed above.

In addition to the polyazole, the inventive composition comprises orthophosphoric acid ($H_3PO_4$) and/or polyphosphoric acid $H_{n+2}P_nO_{3n+1}$ (n>1). The polyphosphoric acid used may be commercial polyphosphoric acid, as obtainable, for example, from Riedel-de Haen.

The relative proportions of the polyazole, the orthophosphoric acid and/or the polyphosphoric acid should be selected such that the polyazole content, based on the total weight of the composition, is in the range from 0.5% by weight to 30.0% by weight, preferably in the range from 1.0% by weight to 20.0% by weight, more preferably in the range from 1.5% by weight to 10.0% by weight, especially in the range from 1.7% by weight to 5.0% by weight, the $H_3PO_4$ and/or polyphosphoric acid content, based on the total weight of the composition, is in the range from 30.0% by weight to 99.5% by weight, preferably in the range from 40.0% by weight to 99.0% by weight, more preferably in the range from 60.0% by weight to 98.5% by weight, especially in the range from 85.0% by weight to 95.0% by weight, the $H_3PO_4$ and/or polyphosphoric acid concentration, calculated as $P_2O_5$ (by acidimetric means), based on the total amount of $H_3PO_4$ and/or polyphosphoric acid and/or water, is in the range from 70.5% to 75.45%, preferably in the range from 71.0% to 75.0%, more preferably in the range from 71.5% to 74.0%, even more preferably in the range from 71.7% to 73.0%, especially in the range from 72.0% to 72.4%.

The inventive composition is in the form of a dispersion and/or solution and may optionally comprise small solids contents and/or gel contents. More preferably, the proportion of constituents which can be filtered off is, however, less than 30.0% by weight, preferably less than 10.0% by weight, more preferably less than 5.0% by weight, especially preferably less than 3.0% by weight, especially less than 1.0% by weight, based in each case on the total weight of the composition. The amounts which can be filtered off are favorably determined at 160° C. In addition, preference is given to using sieves with sieve orifices (meshes) smaller than 1.0 mm, preferably smaller than 500 μm, more preferably smaller than 100 μm.

To further improve the performance properties, it is additionally possible to add fillers, especially proton-conducting fillers, and additional acids to the composition.

Nonlimiting examples of proton-conducting fillers are sulfates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_8$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, phosphides such as ZrP, TiP, HfP oxides such as $Al_2O_3$, $Sb_2O_5$, $ThO_2$, $SnO_2$, $ZrO_2$, $MoO_3$ silicates such as zeolites, zeolites ($NH_4+$), sheet silicates, framework silicates, H-natrolites, H-mordenites, $NH_4$-analcines, $NH_4$-sodalites, $NH_4$-gallates, H-montmorillonites, other condensation products of orthosilicic acid $Si(OH)_4$ and the salts and esters thereof, polysiloxanes of the general formula $H_3Si-(O-SiH_2-)_n-O-SiH_3$, and especially also other clay minerals, such as montmorillonites, bentonites, kaolinites, pyrophillites, talc, chlorites, muscovites, mica, smectites, halosites, vermiculites and hydrotalcites.

acids such as $HClO_4$, $SbF_5$ fillers such as carbides, especially SiC, $Si_3N_4$, fibers, especially glass fibers, glass powders and/or polymer fibers, nonwovens or wovens, preferably based on polyazoles and/or polyaryl ether ketones or polyaryl ether sulfones, also partly crosslinked. The fillers may also be modified partly or fully, based on the aromatic content, by charged groups, particularly suitable groups in this context being sulfonic acid groups, phosphonic acid groups, phosphate groups and/or other anionic or cationic charged groups.

These additives may be present in the composition in customary amounts, although the positive properties, such as high conductivity, high lifetime and high mechanical stability of the membrane, should not be impaired too significantly by addition of excessively large amounts of additives. In general, the resulting membrane comprises at most 80% by weight, preferably at most 50% by weight and more preferably at most 20% by weight of additives.

The composition may also further comprise perfluorinated sulfonic acid additives (preferably 0.1-20% by weight, more preferably 0.2-15% by weight, very preferably 0.2-10% by weight). These additives lead to improved performance, in the vicinity of the cathode to an increase in the oxygen solubility and oxygen diffusion, and to a reduction in the adsorption of phosphoric acid and phosphate to platinum. (Electrolyte additives for phosphoric acid fuel cells. Gang, Xiao; Hjuler, H. A.; Olsen, C.; Berg, R. W.; Bjerrum, N. J., Chem. Dep. A, Tech. Univ. Denmark, Lyngby, Den., J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S., Case Cent. Electrochem. Sci., Case West. Reserve Univ., Cleveland, Ohio, USA. J. Electrochem. Soc. (1989), 136(2), 385-90.)

Nonlimiting examples of persulfonated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfoimides and Nafion.

The inventive composition can be prepared by simply mixing the components. Alternatively, the concentration of $H_3PO_4$ and/or polyphosphoric acid-containing compositions with lower $P_2O_5$ concentration or the dilution of those compositions with higher $P_2O_5$ concentration, i.e. the removal or the supply of water, is also conceivable.

However, it should be noted in this context that, in some cases, especially at low temperatures and/or high solids contents, the dissolution or dispersion of the polyazole in the orthophosphoric acid and/or polyphosphoric acid is kinetically inhibited. The composition is then initially present in inhomogeneous form. At higher temperatures greater than 100° C., there is additionally evaporation of water out of the composition, with the result that the concentration of $H_3PO_4$ and/or polyphosphoric acid changes with time.

Appropriately, therefore, the inventive composition is prepared by a process in which a) at least one polyazole is dissolved and/or dispersed in orthophosphoric acid and/or polyphosphoric acid, the concentration of $H_3PO_4$ and/or polyphosphoric acid, calculated as $P_2O_5$ based on the total amount of $H_3PO_4$ and/or polyphosphoric acid and/or water, selected being less than 72.0%, preferably less than 71.7%, more preferably less than %, even more preferably less than 71.0%, especially less than 70.5%, and b) water is removed from the solution or dispersion from step a) and the concentration of $H_3PO_4$ and/or polyphosphoric acid, calculated as $P_2O_5$ based on the total amount of $H_3PO_4$ and/or polyphosphoric acid and/or water, is increased preferably by at least 0.1%, more preferably by at least 0.5%, especially preferably by at least 1.0%, especially by at least 1.5%.

The solution or dispersion from step a) is generally obtainable in a manner known per se, for example by mixing the components. Further preparation methods are described in WO 02/08829.

More preferably, the solution or dispersion from step a) is obtained by hydrolyzing a solution or dispersion which comprises at least one polyazole and polyphosphoric acid. Such a solution or dispersion can be prepared by polymerizing the aforementioned monomers in polyphosphoric acid.

The solution or dispersion from step a) comprises, based on the total weight thereof, preferably at least 1.8% by weight, more preferably at least 2.0% by weight, especially in the range from 2.2 to 2.5% by weight, of at least one polyazole with an intrinsic viscosity, measured in at least 96% by weight sulfuric acid, in the range from 3.0 to 8 g/dl. The total amount of orthophosphoric acid, water and optionally phosphoric acid is preferably up to 98.2% by weight and is more preferably in the range from 90.0 up to 98.0% by weight, especially in the range from 95.0 to 97.8% by weight.

The water is removed in step b) preferably by evaporation, especially by heating the composition from step a) to more than 100° C. and/or by applying reduced pressure. Particular preference is given to a procedure in which the composition from step a) is heated to a temperature in the range from greater than 120° C. to 240° C., especially in the range from 120° C. to 160° C., appropriately for a time in the range from at least 1 h to at most 48 h, especially in the range from at least 2 h to at most 24 h.

In a further preferred variant of the present invention, the inventive composition is prepared by i) initially charging a solution or dispersion of a polyazole with an intrinsic viscosity, measured in at least 96% by weight sulfuric acid, in the range from 3.0 to 8.0 g/dl in polyphosphoric acid at a temperature greater than 160° C., preferably greater than 180° C., especially in the range from 180° C. to 240° C., the concentration of $H_3PO_4$ and/or polyphosphoric acid, calculated as $P_2O_5$ (by acidimetric means) based on the total amount of $H_3PO_4$ and/or polyphosphoric acid and/or water, being greater than 72.4%, preferably greater than 73.0%, more preferably greater than 74.0%, even more preferably greater than 75.0%, especially greater than 75.45%, ii) adding water, orthophosphoric acid and/or polyphosphoric acid to the solution or dispersion until the mixture has a total amount of $H_3PO_4$ and/or polyphosphoric acid, calculated as $P_2O_5$ (by acidimetric means) based on the total amount of $H_3PO_4$ and/or polyphosphoric acid and/or water, in the range from 70.5% to 75.45%, preferably in the range from 71.0% to 75.0%, more preferably in the range from 71.5% to 74.0%, even more preferably in the range from 71.7% to 73.0%, especially in the range from 72.0% to 72.4%, iii) homogenizing the mixture while keeping the total amount of $H_3PO_4$ and/or polyphosphoric acid within the range specified in step ii).

The solution or dispersion from step i) is generally obtainable in a manner known per se, for example by mixing the components. Further preparation methods are described in WO 02/08829.

The solution or dispersion from step a) is more preferably obtained by polymerizing the aforementioned monomers in polyphosphoric acid.

The solution or dispersion from step i) comprises, based on the total weight thereof, preferably at least 1.8% by weight, more preferably at least 2.0% by weight, especially in the range from 2.2 to 2.5% by weight, of at least one polyazole with an intrinsic viscosity, measured in at least 96% by weight sulfuric acid, in the range from 3.0 to 8 g/dl, and preferably up to 98.2% by weight, more preferably in the range from 90.0 up to 98.0% by weight, especially in the range from 95.0 to 97.8% by weight, of polyphosphoric acid and optionally orthophosphoric acid and/or water.

The polyphosphoric acid used may be commercial polyphosphoric acid as obtainable, for example, from Riedel-de Haen. The polyphosphoric acid $H_{n+2}P_nO_{3n+1}$ (n>1) preferably has a content, calculated as $P_2O_5$ (by acidimetric means), of at least 83%.

The conventional hydrolysis of such compositions leads to compositions with worsened flow behavior, which are no longer processable under standard conditions. Therefore, in accordance with the invention, steps ii) and iii) are performed.

The addition in step ii) can be effected either in portions or continuously.

After the addition, the mixture comprises, based on the total weight thereof, preferably at least 1.6% by weight, more preferably at least 1.8% by weight, especially in the range from 2.0 to 2.3% by weight, of at least one polyazole with an intrinsic viscosity, measured in at least 96% by weight sulfuric acid, in the range from 3.0 to 8 g/dl, and preferably up to 98.4% by weight, preferably in the range from 90.0 up to 98.2% by weight, especially in the range from 95.0 to 98.0% by weight, of polyphosphoric acid and optionally orthophosphoric acid and/or water.

As a result of the addition in step ii), an inhomogeneous mixture forms at first. "Inhomogeneous" refers here to a change in the optical or physical properties which alters the equality of a property over the entire extent of the system, or the homogeneity of the appearances of the solution. Typically, the change in the homogeneity of the solution is manifested by interface formation (separation of liquid from the viscous mass), change in the color (typically from green to yellowish), or else the separation of clearly visible particles or solid particles from the smooth solution. The solution is considered to be homogeneous when it appears to be the same as the solution or dispersion of the polyazole in polyphosphoric acid; any differences are merely in viscosity.

The homogenization in step iii) is effected preferably in a closed system, for example in an autoclave. It is also particularly favorable to condense any water which evaporates and to supply it back to the mixture, preferably by condensing the evaporating water in at least one reflux condenser which is preferably connected directly to the reaction vessel.

Surprisingly, the solution homogenizes after a certain time, preferably within less than 4 h, especially after no later than 2 h. The solution viscosity of the mixture falls, and a composition in accordance with the invention forms.

Possible fields of use of the inventive composition are immediately apparent to a person skilled in the art. It will be used with particular preference for production of a coated substrate, by applying the inventive composition to a substrate, appropriately a flat electrode.

The application to the substrate can be effected in a manner known per se. Particularly useful methods have been found to be spraying, knife coating and casting, especially knife coating.

In a particularly preferred variant of the present invention, the procedure is that I) the substrate is placed on a carrier, II) a matrix with at least one cutout is positioned over the substrate such that the area to be coated is not covered by the matrix, III) the substrate is coated with the inventive composition, preferably by knife coating, IV) the coated substrate is detached from the matrix and the carrier.

The matrix used for step II) is preferably a flat structure, especially a polymer film provided with at least one cutout. The shape, size and depth of the cutout are preferably selected according to the desired shape, size and thickness of the coating.

The composition can then be applied extremely effectively and in an automated manner by applying the inventive composition, especially by knife coating, preferably by filling the entire cutout with the composition.

Any unwanted amounts of the solution outside of the cutout are simply also removed by the removal of the matrix.

According to the invention, the coating is effected preferably at a temperature of less than 160° C., more preferably less than 120° C., especially in the range from 20° C. to 100° C.

In addition, the coated substrate can preferably be subjected to an aftertreatment. However, such an aftertreatment is not absolutely necessary for compositions with a total amount of $H_3PO_4$ and/or polyphosphoric acid, calculated as $P_2O_5$ (by acidimetric means), based on the total amount of $H_3PO_4$ and/or polyphosphoric acid and/or water, of less than 72.43%. These compositions can instead be used further directly, without aftertreatment. This is a further advantage of the inventive compositions.

The aftertreatment can be performed with dilute $H_3PO_4$, especially with a concentration of 30-85%. Likewise possible is aftertreatment with water or moisture. The coating is treated preferably at temperatures in the range from –100° C. to 150° C., preferably at temperatures between 10° C. and 120° C., especially between room temperature (20° C.) and 110° C., more preferably between 30° C. and 100° C. In addition, the treatment is preferably accomplished under standard pressure, but it can also be effected under the action of pressure. In a particularly preferred variant of the present invention, the coating is conducted by means of a bath comprising water or aqueous liquids.

The moisture treatment of the coating causes a consolidation of the composition and a decrease in the layer thickness and preferably the formation of a membrane in the form of a self-supporting film. The consolidated coating generally has a thickness between 15 and 3000 μm, preferably 20 and 2000 μm, especially between 20 and 1500 μm, the membrane being self-supporting.

The upper temperature limit for the moisture treatment is generally 150° C. In the case of extremely brief action of moisture, for example of superheated steam, this vapor may also be hotter than 150° C. The essential factor for the upper temperature limit is the duration of the treatment.

The moisture treatment can also be effected in climate-controlled chambers, in which the action of moisture can be controlled. In this case, the moisture content can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time depends on the thickness of the membrane.

In general, the treatment time is between a few seconds and minutes, for example under the action of superheated steam, or up to whole days, for example under air at room temperature and low relative air humidity. The treatment time is preferably between 10 seconds and 300 hours, especially 1 minute to 200 hours.

When the moisture treatment is performed at room temperature (20° C.) with ambient air of relative air humidity 40-80%, the treatment time is preferably between 1 and 200 hours.

The coating obtained can be configured so as to be self-supporting, i.e. it can be detached without damage from the carrier and then optionally processed further directly.

It is possible to adjust the concentration of phosphoric acid and hence the conductivity of the inventive polymer membrane via the degree of moisture treatment, i.e. the time, temperature and ambient humidity. According to the invention, the concentration of phosphoric acid is reported as moles of acid per mole of repeat unit of the polymer. In the context of the present invention, the concentration (moles of phosphoric acid based on one repeat unit of the formula (III), i.e. polybenzimidazole) is preferably between 10 and 90, more preferably between 12 and 85 and especially between 15 and 80 moles of phosphoric acid.

In a preferred embodiment of the present invention, the coating is crosslinked. For this purpose, it is advantageous to use monomers capable of crosslinking, which are preferably applied to the coating to be crosslinked.

The monomers capable of crosslinking are especially compounds which have at least 2 carbon-carbon double bonds. Preference is given to dienes, trienes, tetraenes, dimethyl acrylates, trimethyl acrylates, tetramethyl acrylates, diacrylates, triacrylates, tetraacrylates.

Particular preference is given to dienes, trienes, tetraenes of the formula

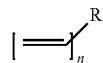

dimethyl acrylates, trimethyl acrylates, tetramethyl acrylates of the formula

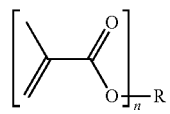

diacrylates, triacrylates, tetraacrylates of the formula

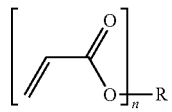

in which

R is a C1-C15-alkyl group, C5-C20-aryl or heteroaryl group, NR', —SO$_2$, PR', Si(R')$_2$, where the above radicals in turn may be substituted, R' is independently hydrogen, a C1-C15-alkyl group, C1-C15-alkoxy group, C5-C20-aryl or heteroaryl group and n is at least 2.

The substituents of the above R radical are preferably halogen, hydroxyl, carboxy, carboxyl, carboxyl ester, nitrile, amine, silyl, siloxane radicals.

Particularly preferred crosslinkers are allyl methacrylate, ethylene glycol dimethacrylate, diethylene glycol dimethacrylate, triethylene glycol dimethacrylate, tetra- and polyethylene glycol dimethacrylate, 1,3-butanediol dimethacrylate, glyceryl dimethacrylate, diurethane dimethacrylate, trimethylpropane trimethacrylate, epoxy acrylates, for example Ebacryl, N',N-methylene-bisacrylamide, carbinol, butadiene, isoprene, chloroprene, divinylbenzene and/or bisphenol-A dimethyl acrylate. These compounds are commercially available, for example, from Sartomer Company Exton, Pennsylvania under the designations CN-120, CN104 and CN-980.

The use of crosslinkers is optional, and these compounds can be used typically in the range between 0.05 to 30% by weight, preferably 0.1 to 20% by weight, more preferably 1 and 10% by weight, based on the weight of the coating.

The crosslinking monomers can also be applied by spraying, etc.

The crosslinking monomers are preferably polymerized free-radically. The free radicals can be formed thermally, photochemically, chemically and/or electrochemically.

For example, an initiator solution can be applied to the coating to be crosslinked. This can be done by means of measures known per se (for example dipping, spraying, etc.) which are known from the prior art.

Suitable free-radical initiators include azo compounds, peroxy compounds, persulfate compounds or azoamidines. Nonlimiting examples are dibenzoyl peroxide, dicumene peroxide, cumene hydroperoxide, diisopropyl peroxo-dicarbonate, bis(4-t-butylcyclohexyl) peroxodicarbonate, dipotassium persulfate, ammonium peroxodisulfate, 2,2'-azobis(2-methylpropionitrile) (AIBN), 2,2"-azobis-(isobutyramidine) hydrochloride, benzpinacol, dibenzyl derivatives, methyl ethylene ketone peroxide, 1,1-azobiscyclohexanecarbonitrile, methyl ethyl ketone peroxide, acetylacetone peroxide, dilauryl peroxide, didecanoyl peroxide, tert-butyl per-2-ethyl hexanoate, ketone peroxide, methyl isobutyl ketone peroxide, cyclohexanone peroxide, dibenzoyl peroxide, tert-butyl peroxybenzoate, tert-butyl peroxyisopropylcarbonate, 2,5-bis (2-ethylhexanoylperoxy)-2,5-dimethylhexane, tert-butyl peroxy-2-ethylhexanoate, tert-butyl peroxy-3,5,5-trimethylhexanoate, tert-butyl peroxyisobutyrate, tert-butyl peroxyacetate, dicumyl peroxide, 1,1-bis(tert-butylperoxy)cyclohexane, 1,1-bis(tert-butylperoxy)-3,3,5-trimethyl-cyclohexane, cumyl hydroperoxide, tert-butyl hydroperoxide, bis(4-tert-butylcyclo-hexyl) peroxydicarbonate, and the free-radical initiators obtainable from DuPont under the ®Vazo name, for example ®Vazo V50 and ®Vazo WS.

In addition, it is also possible to use free-radical initiators which form free radicals under irradiation. Preferred compounds include α,α-diethoxyacetophenone (DEAP, Upjohn Corp), n-butyl benzoin ether (®Trigonal-14, AKZO) and 2,2-dimethoxy-2-phenylacetophenone (®Irgacure 651) and 1-benzoylcyclohexanol (®Irgacure 184), bis(2,4,6-trimethylbenzoyl)phenylphosphine oxide (®Irgacure 819) and 1-[4-(2-hydroxyethoxy)phenyl]-2-hydroxy-2-phenylpropan-1-one (®Irgacure 2959), each of which is commercially available from Ciba Geigy Corp.

Typically between 0.0001 and 5% by weight, especially 0.01 and 3% by weight (based on the weight of the free-radically polymerizable monomers), of free-radical initiator is added. The amount of free-radical initiator can be varied according to the desired degree of polymerization.

The polymerization can also be effected by the action of IR or NIR (IR=InfraRed, i.e. light with a wavelength of more than 700 nm; NIR=Near IR, i.e. light with a wavelength in the range from approx. 700 to 2000 nm, or an energy in the range from approx. 0.6 to 1.75 eV).

The polymerization can also be effected by the action of UV light with a wavelength of less than 400 nm. This polymerization method is known per se and is described, for example, in Hans Joerg Elias, Makromolekulare Chemie [Macromolecular Chemistry], 5th edition, volume 1, p. 492-511; D. R. Arnold, N. C. Baird, J. R. Bolton, J. C. D. Brand, P. W. M Jacobs, P. de Mayo, W. R. Ware, Photochemistry—An Introduction, Academic Press, New York and M. K. Mishra, Radical Photopolymerization of Vinyl Monomers, J. Macromol. Sci.-Revs. Macromol. Chem. Phys. C22(1982-1983) 409.

The polymerization can also be achieved by the action of β rays, γ rays and/or electron beams. In a particular embodiment of the present invention, a coating is irradiated with a radiation dose in the range from 1 to 300 kGy, preferably from 3 to 200 kGy and most preferably from 20 to 100 kGy.

The polymerization of the crosslinking monomers is effected preferably at temperatures above room temperature (20° C.) and less than 200° C., especially at temperatures between 40° C. and 150° C., more preferably between 50° C. and 120° C. The polymerization is effected preferably under standard pressure, but can also be effected under the action of pressure. The polymerization leads to consolidation of the coating, and this consolidation can be monitored by microhardness measurement. The increase in the hardness caused by the polymerization is preferably at least 20%, based on the hardness of the coating before crosslinking.

According to the desired degree of polymerization, the flat structure which is obtained after the polymerization is a self-supporting membrane. The degree of polymerization is preferably at least 2, especially at least 5, more preferably at least 30, repeat units, especially at least 50 repeat units, most preferably at least 100 repeat units. This degree of polymerization is determined via the number-average molecular weight $M_n$, which can be determined by GPC methods.

After the moisture treatment, the coating can still be crosslinked by the action of heat in the presence of oxygen. This curing of the coating additionally improves the properties of the coating. For this purpose, the coating can be heated to a temperature of at least 150° C., preferably at least 200° C. and more preferably at least 250° C. The oxygen concentration in this process step is typically in the range from 5 to 50% by volume, preferably 10 to 40% by volume, without any intention that this should impose a restriction. This crosslinking too can be effected by the action of IR or NIR (IR=infrared, i.e. light with a wavelength of more than 700 nm; NIR=near IR, i.e. light with a wavelength in the range from approx. 700 to 2000 nm or an energy in the range from approx. 0.6 to 1.75 eV). A further method is irradiation with β rays. The radiation dose here is between 5 and 200 kGy.

According to the desired degree of crosslinking, the duration of the crosslinking reaction may be within a wide range. In general, this reaction time is within the range from 1 second to 10 hours, preferably 1 minute to 1 hour, without any intention that this should impose a restriction.

The inventive procedure allows comparatively simple and inexpensive production of acid-doped, polyazole-comprising membranes, which can be implemented easily on the industrial scale. This can achieve especially the following advantages:

the membranes can be produced with a much better space-time yield, membranes are obtained with comparatively high quality and reproducibility; quality variations between different batches are barely ever observed, the processing of polyazoles with comparatively high molecular weights is now possible and the formation of bubbles in the membrane is virtually completely prevented.

Fields of use of the membranes obtainable by the process according to the invention comprise especially the use thereof as a polymer electrolyte membrane in fuel cells. For further details, reference is made to publications DE 102 13 540 A1, DE 102 46 559 A1 and DE 102 46 461 A1, the disclosure of which is incorporated herein by reference.

Particular preference is given in the context of the present invention to the use of the substrate coated in accordance with the invention for production of membrane electrode assemblies, especially for fuel cells. These are favorably obtained by compressing the coated substrate with a further substrate, preferably a further flat electrode.

The present invention further provides a process for producing a polymer fiber, comprising the steps of
A) extruding the inventive composition to form fibers,
B) introducing the fibers formed in step A) into a liquid bath,
C) isolating and drying the resulting fibers.

The extrusion in step A) can be effected by means of all known methods of fiber formation. The fibers formed may be endless filaments or—if the fibers are formed analogously to the melt blowing method—be of staple fiber character. The linear density of the fibers formed is not subject to any restriction, and so it is also possible to produce monofils, i.e. wire-like fibers. In addition to these, it is also possible to produce hollow fibers. The desired linear density arises from the intended use of the fiber. The overall handling of the fibers formed can be effected by means of known fiber technologies.

In one variant of the invention, the composition extruded in step A) is saturated beforehand with a gas. For this purpose, all gases which are inert under the conditions selected are suitable. The saturation is preferably effected in the supercritical state, such that the gas forms pores in the subsequent expansion. This technology is known by the MuCell® name. Application of the MuCell technology to the process according to the invention makes it possible for the first time to obtain microfoams of polyazole polymers, especially based on the polyimidazole, polybenzthiazole, polybenzoxazole, polyoxadiazole, polyquinoxaline, polythiadiazole, poly(pyridine), poly(pyrimidine) and poly(tetrazapyrene) polymers.

After the extrusion in step A), the fibers formed are introduced into a precipitation bath. This introduction is effective within the temperature range between room temperature (20° C.) and the boiling temperature of the precipitation liquid (at standard pressure).

The precipitation liquids used in the context of the invention and in the context of step B) are solvents which are present in liquid form at room temperature [i.e. approx. 20° C.] and are selected from the group of the alcohols, ketones, alkanes (aliphatic and cycloaliphatic), ethers (aliphatic and cycloaliphatic), esters, carboxylic acids, where the above group members may be halogenated, water, inorganic acids (for example $H_3PO_4$, $H_2SO_4$) and mixtures thereof.

Preference is given to using C1-C10 alcohols, C2-C5 ketones, C1-C10-alkanes (aliphatic and cycloaliphatic), C2-C6-ethers (aliphatic and cycloaliphatic), C2-C5 esters, C1-C3 carboxylic acids, dichloromethane, water and mixtures thereof.

Subsequently, the fiber is freed of the precipitation liquid. This is preferably done by drying, the temperature and the ambient pressure being selected as a function of the partial vapor pressure of the precipitation liquid. The drying is effected typically at standard pressure and temperatures between 20° C. and 200° C. Gentler drying can also be effected under reduced pressure. The drying method is not subject to any restriction.

The treatment in the precipitation bath can lead to the formation of porous structures. Depending on the use, these are desirable for the subsequent use.

In one variant, the fibers after the extrusion in step A) can a treatment of the fibers formed as described in step B) be effected.

This treatment of the fibers is effected at temperatures above 0° C. and less than 150° C., preferably at temperatures between 10° C. and 120° C., especially between room temperature (20° C.) and 90° C., in the presence of moisture or water and/or water vapor and/or water-containing phosphoric acid of up to 85%. The treatment is preferably effected under standard pressure, but can also be effected under the action of pressure. It is essential that the treatment is accomplished in the presence of sufficient moisture, as a result of which the polyphosphoric acid present contributes to consolidation of the fiber as a result of partial hydrolysis to form low molecular weight polyphosphoric acid and/or phosphoric acid.

The partial hydrolysis of the polyphosphoric acid leads to consolidation of the fiber such that it becomes self-supporting, and also leads to a decrease in the linear density of the fiber.

The intra- and intermolecular structures (interpenetrating networks, IPN) present in the polyphosphoric acid layer lead to an ordered polymer structure which is found to be responsible for the good properties of the fibers formed.

The upper temperature limit of the treatment is generally 150° C. In the case of extremely brief action of moisture, for example of superheated steam, this steam may also be hotter than 150° C. The essential factor for the upper temperature limit is the duration of the treatment.

The partial hydrolysis (step B) can also be effected in climate-controlled chambers, in which the hydrolysis can be controlled under defined action of moisture. In this case, the moisture content can be adjusted in a controlled manner via the temperature or saturation of the contact environment, for example gases such as air, nitrogen, carbon dioxide or other suitable gases, or water vapor. The treatment time depends on the parameters selected above.

In addition, the treatment time depends on the thickness of the fiber.

In general, the treatment time is between a few fractions of a second and a few seconds, for example under the action of superheated steam, or heated moist air.

In principle, the treatment can also be performed at room temperature (20° C.) with ambient air of relative air humidity 40-80%. However, this prolongs the treatment time.

The invention is illustrated further hereinafter by examples, though this shall not restrict the concept of the invention.

Example 1

Solutions of poly(2,2'-(m-phenylene)-5,5'-bibenzimidazole) (=PBI) in polyphosphoric acid (PPA) were prepared by the process described in general terms in WO 02/088219. The contents of the PBI and the concentration of the polyphosphoric acid, calculated as $P_2O_5$ (by acidimetric means), based on the total amount of $H_3PO_4$ and/or polyphosphoric acid and/or water, are compiled in tables 1.1 and 1.2 below.

The solution viscosities of the compositions are likewise reported. The corresponding measurements were conducted under $N_2$ atmosphere with a shear stress-controlled Physika MCR300 rotary viscometer by means of a plate-plate geometry (upper plate ø 25 mm; separation: 1 mm; all samples at 30° C.; samples 4, 5 and 6 at 150° C.) or of a cone-plate geometry (upper plate ø 50 mm-2°; tip taper: 0.053 mm; samples 1, 2 and 3 at 150° C.).

It is clearly evident that the viscosity of the inventive composition under the same conditions and solids content is considerably lower than that of a conventional PBI solution. This results in a considerable advantage for processing to a membrane.

TABLE 1.1

Measurement temperature 30° C.

| Sample | PBI [% by wt] | $c(P_2O_5)$ in [%] | Solution viscosity in [Pa s] | |
|---|---|---|---|---|
| | | | Shear rate 1 Hz | Shear rate 100 Hz |
| 1+ | 0 | 83.29 | 15.7 | 15.4 |
| 2+ | 0 | 84.02 | 42.3 | 41.4 |
| 3+ | 0 | 84.74 | 70.0 | 67.5 |
| 4+ | 0 | 85.46 | 167.0 | 162.0 |
| 5 | 2.00 | 84.02 | 5770.0 | 292.0 |
| 6* | 2.22 | 72.43 | 449.0 | 42.7 |

+monomer solution for 2% by weight of polymer
*inventive

TABLE 1.2

Measurement temperature 150° C.

| Sample | PBI [% by wt.] | $c(P_2O_5)$ in [%] | Solution viscosity in [Pa s] | |
|---|---|---|---|---|
| | | | Shear rate 1 Hz | Shear rate 100 Hz |
| 1+ | 0 | 83.29 | 0.157 | 0.099 |
| 2+ | 0 | 84.02 | 0.201 | 0.186 |
| 3+ | 0 | 84.74 | 0.314 | 0.297 |
| 4+ | 0 | 85.46 | 0.888 | 0.778 |
| 5 | 2.00 | 84.02 | 399.000 | 31.300 |
| 6* | 2.22 | 72.43 | 11.600 | 5.430 |

+monomer solution for 2% by weight of polymer
*inventive

Example 2

A 2% by weight solution of poly(2,2'-(m-phenylene)-5,5'-bibenzimidazole) (=PBI; intrinsic viscosity=5.65 dL/g) in polyphosphoric acid (PPA; 83.4%, calculated as $P_2O_5$ (by acidimetric means) based on the total amount of $H_3PO_4$ and/or polyphosphoric acid and/or water) was prepared by the process described in general terms in WO 02/088219. The solution was heated to 240° C. and initially charged in an HWS reactor with reflux condenser & dropping funnel. The mixture was diluted with water, and the amount of water was selected such that the total amount of $H_3PO_4$ and polyphosphoric acid, calculated as $P_2O_5$ (by acidimetric means), based on the total amount of $H_3PO_4$ and/or polyphosphoric acid and/or water, is 72.43%. Thereafter, the temperature is reduced to 180° C. The variation in the solution viscosity with time, expressed in relative units, is summarized in table 2. It is clearly evident that the viscosity of the solution no longer rises after the addition of the water at 180° C. In contrast, the solution viscosity of the conventional solutions, like those of WO 02/088219, continues to rise under the same conditions until they are ultimately no longer processable. The inventive solution is homogeneous after the addition of water.

TABLE 2

Variation of solution viscosity

| Time (min)<br>End of water addition | Solution viscosity (measured by the force input of the stirrer) (N/cm) |
| --- | --- |
| t = 0 | 69.7 |
| t = 60 | 69.6 |
| t = 120 | 68.9 |
| t = 180 | 68.8 |
| t = 240 | 68.9 |
| t = 300 | 69.3 |
| t = 540 | 69.5 |
| t = 840 | 70.4 |

Example 3

Procedure as in example 2 with a 2.5% by weight solution. The variation in the solution viscosity with time, expressed in relative units, is summarized in table 3. This clearly shows the decrease in the viscosity of the solution after addition of water and dilution, and the establishment of a plateau without any further increase in the solution viscosity of the solution. Without addition of water, the viscosity would have risen further.

TABLE 3

| Time (min) | Solution viscosity (measured by the force input of the stirrer) (N/cm) |
| --- | --- |
| t = 0 | 0 (calibration, temperature 195° C.) |
| t = 30 | 0 |
| t = 60 | 0 |
| t = 120 | 0.5 |
| Increase in temperature to 240° C. (reaction) | |
| t = 180 | 0.6 |
| t = 200 | 9.0 |
| t = 205 | 20.4 |
| t = 210 | 45.7 |
| t = 215 | 85.5 |
| t = 220 | 103.5 |
| Addition of demineralized water, temperature lowered to 200° C. | |
| t = 230 | 121.8 |
| t = 260 | 67.2 |
| t = 290 | 37.7 |
| t = 320 | 27.1 |
| t = 350 | 22.3 |
| t = 380 | 21.0 |
| t = 440 | 19.6 |
| t = 545 | 19.1 |

Example 4

Procedure as in example 2 with a 2.5% by weight solution. The variation in the solution viscosity with time, expressed in relative units, is summarized in table 4. The decline in the solution viscosity after addition of water is clearly evident. Without dilution, the solution would be too viscous for processing and would have to be disposed of.

In addition, solutions which attain an excessively high viscosity in a reactor can thus be made processable again. This dispenses with complex cleaning procedures for vessels, shutdown periods are avoided, and damage to reactors resulting from mechanical cleaning can be avoided.

TABLE 4

| Time (min) | Solution viscosity (measured by the force input of the stirrer) (N/cm) |
| --- | --- |
| t = 0 (17 h 40 min) | 0 (Calibration, temperature 195° C.) |
| t = 60 (18 h 40 min) | 0.5 |
| t = 120 (19 h 40 min) | 1.5 |
| Increase in temperature to 240° C. (reaction) | |
| t = 180 (20 h 40 min) | 1.5 |
| t = 210 (21 h 10 min) | 21.9 |
| t = 220 (21 h 20 min) | 51.5 |
| t = 230 (21 h 30 min) | 84.8 |
| t = 240 (21 h 40 min) | 103.5 |
| Addition of demineralized water, temperature lowered to 200° C. | |
| t = 250 (21 h 50 min) | 96.0 |
| t = 280 (22 h 20 min) | 86.3 |
| t = 290 (22 h 30 min) | 61.2 |
| t = 320 (23 h 00 min) | 67.7 |
| t = 380 (24 h 00 min) | 43.7 |
| t = 440 (25 h 00 min) | 22.0 |
| T = 455 (25 h 15 min) | 23.4 |
| T = 470 (25 h 30 min) | 23.7 |

The invention claimed is:
1. A composition in the form of a solution and/or dispersion, comprising
   at least one polyazole with an intrinsic viscosity, measured in at least 96% by weight sulfuric acid, in the range from 3.0 to 8.0 dl/g, and
   orthophosphoric acid and/or polyphosphoric acid, wherein
   the polyazole content, based on the total weight of the composition, is in the range from 0.5% by weight to 30.0% by weight,
   the $H_3PO_4$ and/or polyphosphoric acid content, based on the total weight of the composition, is in the range from 30.0% by weight to 99.5% by weight,
   the $H_3PO_4$ and/or polyphosphoric acid concentration, calculated as $P_2O_5$ (by acidimetric means), based on the total amount of $H_3PO_4$ and/or polyphosphoric acid and/or water, is in the range from 70.5% to 75.45%.

2. The composition according to claim 1, which has a solution viscosity, measured at a temperature of 150° C. and a shear rate of 1 Hz, in the range from 0.1 Pas to 300 Pas.

3. The composition according to claim 1, wherein the polyazole comprises repeating benzimidazole units.

4. A process for preparing the composition according to claim 1, which comprises
   a) dissolving and/or dispersing at least one polyazole in orthophosphoric acid and/or polyphosphoric acid, the selected concentration of the $H_3PO_4$ and/or polyphosphoric acid, calculated as $P_2O_5$ based on the total amount of $H_3PO_4$ and/or polyphosphoric acid and/or water, being less than 72.0%, and
   b) removing water from the solution or dispersion from step a) and increasing the concentration of the $H_3PO_4$ and/or polyphosphoric acid, calculated as $P_2O_5$ based on the total amount of $H_3PO_4$ and/or polyphosphoric acid and/or water.

5. The process according to claim 4, wherein water is removed by evaporation.

6. The process according to claim 4, wherein the solution from step a) is obtained by hydrolysis of a solution comprising at least one polyazole and polyphosphoric acid.

7. The process according to claim 4, wherein the solution to be used, based on the total weight thereof, comprises
   at least 1.8% by weight of at least one polyazole with an intrinsic viscosity, measured in at least 96% by weight sulfuric acid, in the range from 3.0 to 8 dl/g and
   90.0% by weight to 98.2% by weight of polyphosphoric acid.

8. A process for preparing the composition according to claim 1, which comprises
   i) initially charging a solution or dispersion of a polyazole with an intrinsic viscosity, measured in at least 96% by weight sulfuric acid, in the range from 3.0 to 8.0 dl/g, in polyphosphoric acid at a temperature greater than 160° C., the concentration of $H_3PO_4$ and/or polyphosphoric acid, calculated as $P_2O_5$ (by acidimetric means), based on the total amount of $H_3PO_4$ and/or polyphosphoric acid and/or water, being greater than 72.4%,
   ii) adding water, orthophosphoric acid and/or polyphosphoric acid to the solution or dispersion until the mixture has a total amount of $H_3PO_4$ and/or polyphosphoric acid, calculated as $P_2O_5$ (by acidimetric means), based on the total amount of $H_3PO_4$ and/or polyphosphoric acid and/or water, in the range from 70.5% to 75.45%, and
   iii) homogenizing the mixture, keeping the total amount of $H_3PO_4$ and/or polyphosphoric acid within the range specified in step ii).

9. A process for producing a coated substrate, in which the composition according to claim 1 is applied to a substrate.

10. The process according to claim 9, wherein a flat electrode is coated.

11. The process according to claim 9, wherein
    I) the substrate is placed on a carrier,
    II) a matrix with at least one cutout is positioned over the substrate such that the area to be coated is not covered by the matrix,
    III) the substrate is coated with the solution by knife coating, and
    IV) the coated substrate is detached from the matrix and the carrier.

12. The process according to claim 11, wherein the coating is effected at a temperature less than 160° C.

13. The process according to claim 11, wherein the coated substrate is subjected to a moisture treatment.

14. The process according to claim 11, wherein the coating is crosslinked.

15. The process according to claim 11, wherein the coated substrate is compressed with a further substrate.

16. A process for producing a polymer fiber, comprising the steps of
    A) extruding the composition according to claim 1 to form fibers,
    B) introducing the fibers formed in step B) into a liquid bath, and
    C) isolating and drying the resulting fibers.

17. The process according to claim 16, wherein the fibers formed in step A) are introduced into a precipitation bath.

18. The process according to claim 16, wherein the composition extruded in step A) is saturated with a gas.

19. The process according to claim 16, wherein the composition extruded in step A) is saturated with a gas, in the supercritical state, such that the gas forms pores in the subsequent expansion.

* * * * *